United States Patent
Fiorentino

(10) Patent No.: US 12,160,917 B2
(45) Date of Patent: Dec. 3, 2024

(54) NETWORK DEVICE FOR CONNECTING A PLURALITY OF INDUSTRIAL DEVICES

(71) Applicant: Siemens Aktiengesellschaft, Munich (DE)

(72) Inventor: Vincenzo Fiorentino, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/692,960

(22) PCT Filed: Sep. 16, 2022

(86) PCT No.: PCT/EP2022/075767
§ 371 (c)(1),
(2) Date: Mar. 18, 2024

(87) PCT Pub. No.: WO2023/046587
PCT Pub. Date: Mar. 30, 2023

(65) Prior Publication Data
US 2024/0334518 A1    Oct. 3, 2024

(30) Foreign Application Priority Data

Sep. 21, 2021 (EP) .................................... 21198044

(51) Int. Cl.
*H04L 29/08* (2006.01)
*H04W 12/06* (2021.01)
(Continued)

(52) U.S. Cl.
CPC .......... *H04W 76/15* (2018.02); *H04W 12/06* (2013.01); *H04W 24/02* (2013.01)

(58) Field of Classification Search
None
See application file for complete search history.

(56) References Cited

U.S. PATENT DOCUMENTS

2020/0412653 A1    12/2020  Arora et al.
2021/0021672 A1*    1/2021  Shivarajapura ....... H04L 5/0037

OTHER PUBLICATIONS

PCT International Search Report and Written Opinion of International Searching Authority mailed Mar. 30, 2023, corresponding to PCT International Application No. PCT/EP2022/075767, pp. 1-12.

(Continued)

*Primary Examiner* — Gary Lafontant
(74) *Attorney, Agent, or Firm* — Lempia Summerfield Katz LLC

(57) ABSTRACT

A network device for connecting a plurality of industrial devices to a wireless communication network includes: a frontend radio interface configured to connect to the plurality of industrial devices over one or more wireless communication channels for transmitting data to and receiving data from the plurality of industrial devices; a backend network interface configured to connect to a central network core associated with the wireless communication network over a communication channel; and one or more secondary network functions for managing a plurality of connections with the industrial devices. The central network core includes one or more network functions for managing the wireless communication network. The one or more secondary network functions are configured based on the one or more network functions of the central network core.

8 Claims, 4 Drawing Sheets

(51) Int. Cl.
*H04W 24/02* (2009.01)
*H04W 76/15* (2018.01)

(56) References Cited

OTHER PUBLICATIONS

PCT Preliminary Examination Report mailed Dec. 20, 2023, corresponding to PCT International Application No. PCT/EP2022/075767, pp. 1-7.

* cited by examiner

NETWORK DEVICE FOR CONNECTING A PLURALITY OF INDUSTRIAL DEVICES

The present patent document is a § 371 nationalization of PCT Application Serial No. PCT/EP2022/075767, filed Sep. 16, 2022, designating the United States, and this patent document also claims the benefit of European Patent Application No. 21198044.6, filed Sep. 21, 2021, which are incorporated by reference in their entireties.

TECHNICAL FIELD

The current disclosure relates to wireless communication networks in industrial automation environments including substation automation and process automation, and more particularly to network functions of the wireless communication networks.

BACKGROUND

With the advent of 4G EPC and 5G communication technology, most cellular networks include a central network core that includes a plurality of software based network functions which regulate and manage various aspects of the wireless communication network. These network functions are responsible for the operation of the user plane and the control plane.

SUMMARY AND DESCRIPTION

The scope of the present disclosure is defined solely by the appended claims and is not affected to any degree by the statements within this summary. The present embodiments may obviate one or more of the drawbacks or limitations in the related art.

The current disclosure relates to wireless communication networks in industrial facilities and industrial automation environments. Wireless communication networks deployed in such facilities may need such mission critical applications like fault location and service restoration, etc., and accordingly guarantee ultra-low latency communication. This may be difficult or challenging because radio units of the distributed base stations may be present in locations several kilometers away from the central unit of the distributed base station and the central network core of the wireless communication network. Communication between end devices present in different locations may require a communication loop including the central network core.

For example, for a user device for communicating to another user device, both of the user devices undergo the authentication procedure. Conventionally, the first user device (e.g., responsible for sending a message to the second user device), starts the authentication procedure and once the first user device is authenticated, a data message is sent from the first user device to the second user device via the network core. Then, the network core will page the second user device and start the authentication also on the terminating side. Subsequent to the authentication of second user device, the message is passed to the second user device. Accordingly, such communication may suffer from significant end-to-end latency. For example, average latency for the registration may be about 168 ms, which does not meet the latency requirements of the mission critical use cases (e.g., about 10 ms). Accordingly, there is a need for a device and method that addresses the above mentioned issue.

Accordingly, the current disclosure describes a network device and a method that address the above mentioned issues.

The current disclosure describes a network device for connecting a plurality of industrial devices to a wireless communication network. The network device includes a frontend radio interface configured to connect to the plurality of industrial devices over one or more wireless communication channels for transmitting data to and receiving data from the plurality of industrial devices. The network device further includes a backend network interface configured to connect to a central network core associated with the wireless communication network over a communication channel. The network device further includes one or more secondary network functions for managing a plurality of connections with the industrial devices. The central network core includes one or more network functions for managing the wireless communication network. The one or more secondary network functions are configured based on the one or more network functions of the central network core.

Accordingly, the current disclosure describes a network device that includes one or more secondary network functions that may manage communication aspects for the user devices connected to the network device. Accordingly, the responsibility of the central network core in relation to the user devices connected to the network device is reduced because these aspects are now managed by the secondary network functions. Accordingly, communication in relation to the user devices does not include latency associated with communication with the central network core. Accordingly, the overall latency in relation the communication associated with the user devices is reduced.

In an example, the one or more secondary network functions are configured to operate independent of a connection to the central network core. Accordingly, the secondary network functions may also work independent of disruption of the connection to the central network core. This allows for improved reliability within the wireless communication network. In an example, the one or more network functions includes an application function configured to transfer user information and network policies between the central core and a network exposure function from the one or more secondary network functions. Accordingly, the network core is customized to allow for easy configuration of the secondary network functions of the network device.

In an example, the one or more secondary network functions are associated with admission control and authentication of the industrial devices, management of user plane, and sessions related to connections associated with the industrial devices. Accordingly, these aspects of the communication in relation to the industrial devices connected to the network device are managed by the one or more secondary network functions with minimal to no intervention from the central network core. Accordingly, latency in relation to communication related to these aspects is reduced by eliminating to central network core from the loop. In an example, the network device is one of a cellular base station and a distributed unit of a distributed base station. Accordingly, such secondary network functions may be utilized without involving the central unit of the distributed base station when implemented in the distributed unit of the distributed base station.

In an example, the network exposure function from the one or more secondary network functions is configured to receive an onboarding request from a new industrial device, transmit the onboarding request to the central network core and receive one or more network configurations associated with the one or more secondary network functions in relation to the new industrial device. Accordingly, the network exposure function from the one or more secondary network function is able to fetch all the necessary network configuration in related to the new industrial device to enable the new industrial device to be managed by the secondary network functions without involving the central network core.

In another example, the network exposure function is further configured to communicate with a second network exposure function of a second network device for receiving user information of a second industrial device, wherein the second industrial device is connected to the second network device. In an example, the network device is configured to transmit information from a first industrial device connected to the network device to the second industrial device via the second network device using a first user plane present between the network device and the second network device. In an example, the first user plane is not connected to the central network core. Accordingly, the network device is configured to communicate with the second network device without including the central network core. Accordingly, communication between two user devices connected to the two network devices has relatively low latency.

In another aspect, the current disclosure describes a method for connecting a new industrial device to the wireless communication network by the network device as mentioned above. The method includes receiving an onboarding request from the new industrial device for connecting the new industrial device to the wireless communication network using the frontend radio interface over a wireless communication channel from the one or more wireless communication channel, transmitting the onboarding request to the central network core of the wireless communication network over a backend network interface, receiving a first network configuration associated with the new industrial device from the central network core, and updating the one or more secondary network functions based on the first network configuration. The connection between the new industrial device and the network device is managed by the one or more secondary network functions in accordance with the first network configuration. The advantages of the network device apply to the method as well. These aspects are further explained in reference to FIGS. 1-4.

DETAILED DESCRIPTION

Figure 1:
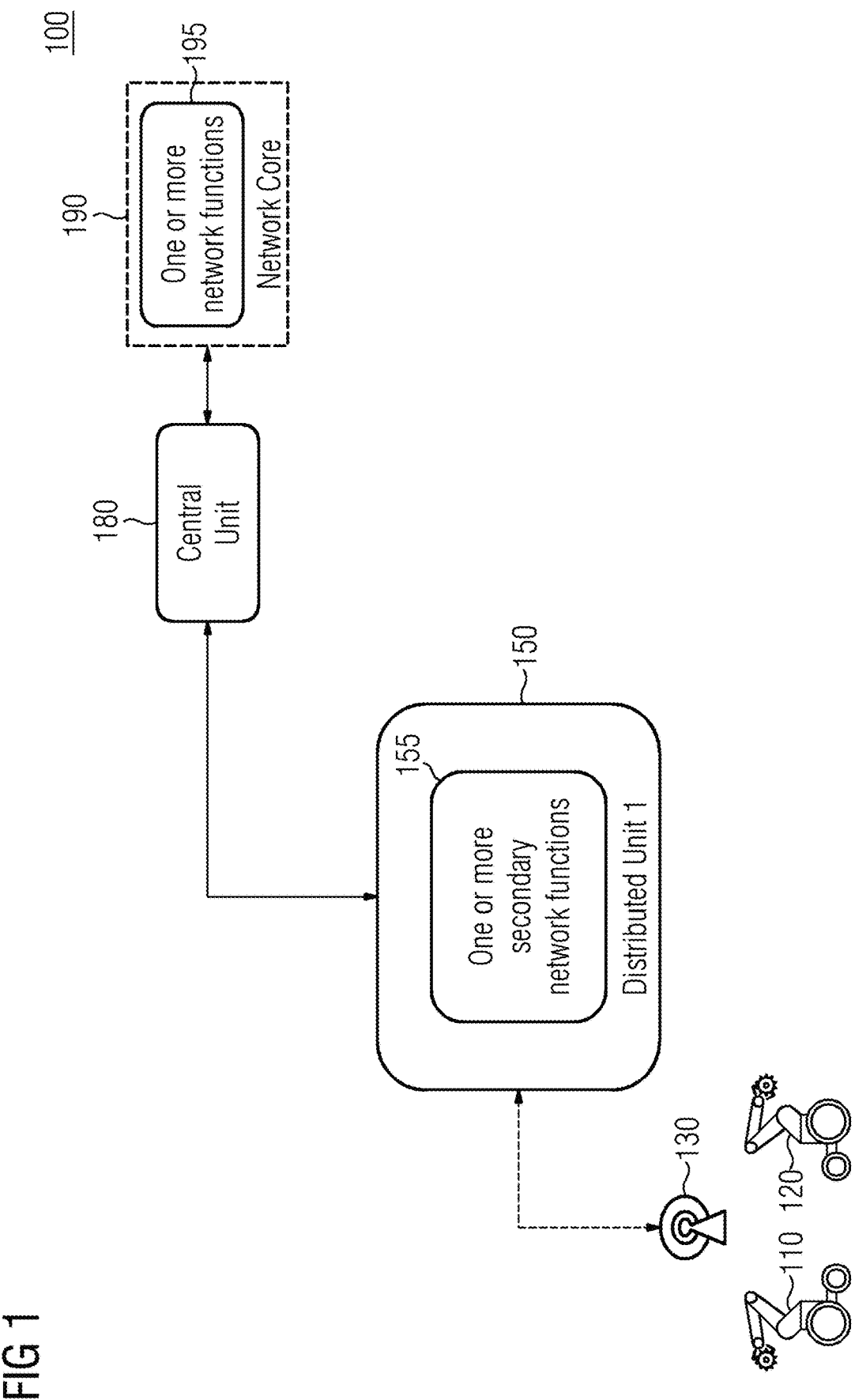
FIG. 1 illustrates an example section of the wireless communication network including a network device with one or more secondary network functions.

FIG. 1 illustrates a section 100 of the wireless communication network in an industrial facility for connecting a plurality of industrial devices with each other. Industrial facility herein refers to any environment where one or more industrial processes such as manufacturing, refining, smelting, or assembly of equipment, generation, transmission, or distribution of electricity, or transportation may take place. This includes process plants, oil refineries, automobile factories, power plants, smart grids, electrical substations, storehouses, etc. The plurality of industrial process and operations may be carried out in production cells using a plurality of devices such as control devices, field devices, mobile devices, etc., present with the corresponding production cell. The control devices include process controllers, programmable logic controllers, supervisory controllers, automated guided vehicles, robots, operator devices, etc. One or more control devices are connected to a plurality of field devices (not shown in figure) such as actuators and sensor devices for monitoring and controlling various industrial processes in the industrial facility. These field devices may include flowmeters, value actuators, temperature sensors, pressure sensors, etc. Additionally, the industrial facility includes a plurality of mobile devices (also referred to as mobile network devices) including one or more robots for performing a plurality of operations such as welding, assembly of parts; one or more autonomous guided vehicles for transportation and handling of material; one or more assets with RFID tags on conveyor belts, etc. in the industrial facility. Additionally, the industrial facility may include an operator station for displaying the status of the industrial facility to an operator and for allowing the operator to define KPIs for the control of the industrial processes in the facility. All the industrial devices may be connected to each other via a plant network (realized via wired and wireless technologies).

Communication in the above-mentioned plant network happens through wired and wireless devices or technologies. Accordingly, the industrial facility utilizes the wireless communication network for enabling communication amongst the various devices of the industrial facility. The wireless network is based on cellular technology and includes a plurality of gateway devices or network devices. Gateway devices herein refers to one or more devices capable of connecting the user devices to the wireless network. Examples of gateway devices include base stations, routers, switches, relays, access points, etc. The plurality of gateway devices may include stationary gateway devices which may be affixed to a plurality of locations in the industrial facility. A plurality of the industrial devices in the facility are connected to one or more gateway devices to connect to the wireless network and for communicating information with the other devices and systems in the industrial facility. The industrial devices include one or more industrial applications which are capable of processing data from other industrial devices.

An example gateway device is a distributed units 150 shown in the figure. The distributed unit 150 belongs to a distributed base station, which further includes a radio unit 130, a distributed unit 150, and a central unit 180. The distributed unit 150 is connected to a plurality of radio units. For example, the distributed unit 150 is connected to radio unit 130. The distributed unit 150 may be regarded as a gateway device. The functions/responsibilities of the central unit 180 and the distributed unit (150) depend on the Split Option utilized in the implementation of the distributed base station. The industrial devices 110 and 120 are connected to the wireless communication network using the distributed base station. Additionally, the wireless communication network includes a central network core 190 that includes a plurality of network functions 195 such as user plane function (UPF), authentication server function (AUSF), access and mobility function (AMF), session management function (SMF), network exposure function (NEF), etc.

Network function herein refers to software module or executable code responsible for realizing and managing as certain network aspect in relation to the wireless communication network. In 5G, the network functions are software modules separate from the hardware and may be executed on any network node. Each virtual function may be deployed on separate machine or even in cloud. Network functions and their related functions are known in the state of the art and have a similar meaning as conventionally known.

The AUSF provides an authentication service for the devices connected to the wireless communication network. Similarly, the UPF User plane function (UPF) supports packet routing and forwarding, packet inspection, QoS handling, etc. Similarly, the Unified Data Management (UDM) network function is responsible for generation of credentials, user identification, access authorization, and subscription management. Similarly, the Access and Mobility Function (AMF) is responsible for manages connection and mobility and includes a Globally Unique AMF Identifier (GUAMI) used to identify an AMF Instance within a 5G Network.

In addition to the central network core, the distributed unit 150 includes one or more secondary network functions (155) that are capable of coordinating with the network functions of the central network core 190 for managing the industrial devices connected to the corresponding network device. This is further explained in reference to FIG. 2.

Figure 2:
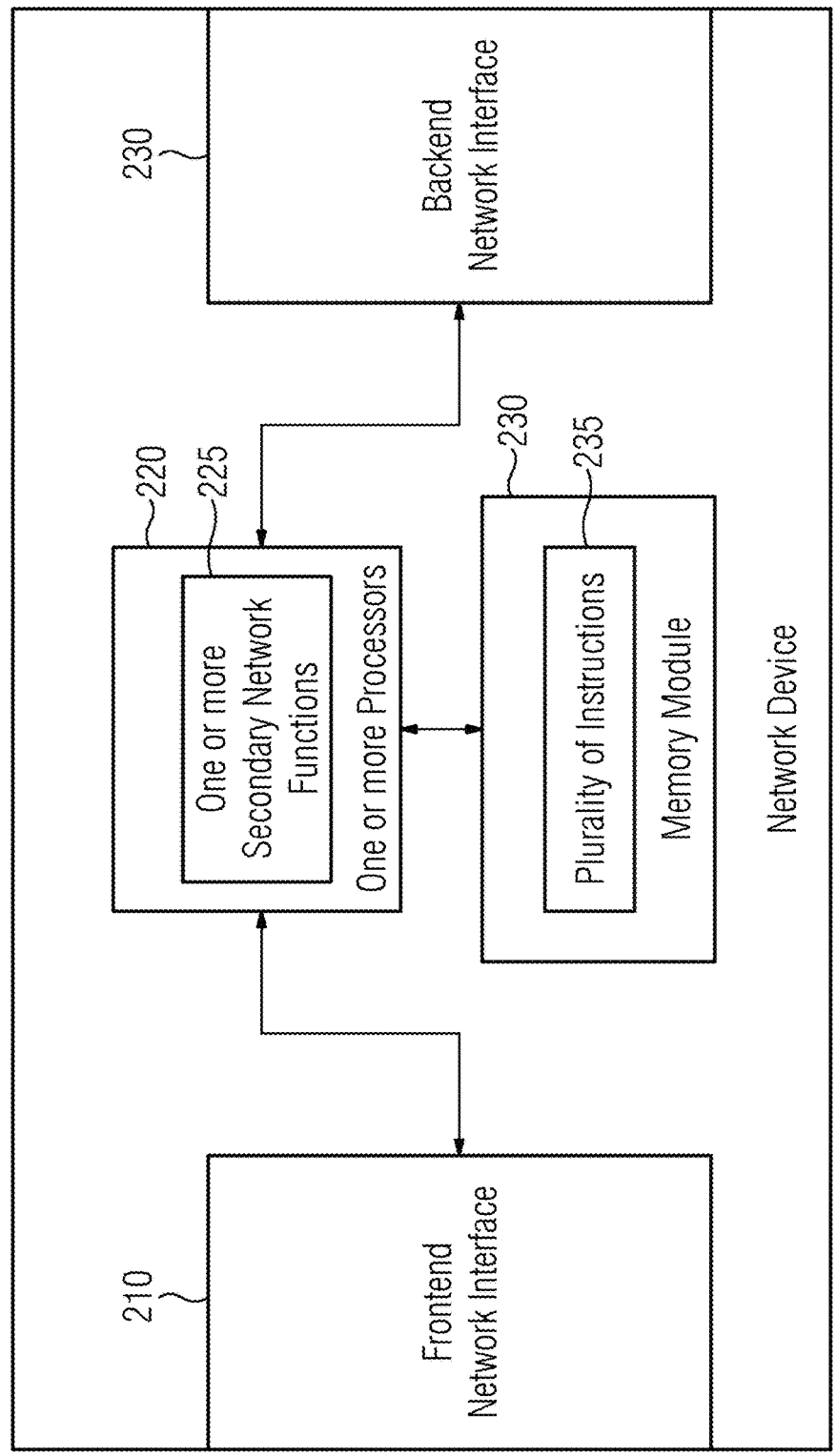
FIG. 2 illustrates an example network device including the one or more secondary network functions for managing one or more industrial devices connected to the example network device.

FIG. 2 illustrates an example network device 200 including the one or more secondary network functions 225 for managing one or more industrial devices (for example, industrial device 110) connected to the example network device 200. In an example, the network device 200 is one of a cellular base station and a distributed unit of a distributed base station.

The example network device 200 includes a frontend network interface 210 for connecting the network device 200 to the industrial devices within the radio range of the network device 200. In an example, where the network device 200 is the distributed unit 150, the frontend radio interface 210 includes the radio unit 130 or is configured to coordinate with the radio unit 130 for connecting to the industrial device/s. The frontend radio interface 210 includes a wireless protocol stack for communication with the industrial device. The frontend radio interface 210 may also include a wired protocol stack for communication with radio units. The network device 200 is configured to transmit and receive data from the industrial devices using the frontend network interface 210. In an example, the frontend network interface 210 includes a 5G radio user data protocol stack based on a MAC-radio link control layer, packet data convergence protocol, service data adaption protocol, etc.

Additionally, the network device 200 includes a backend network interface 230 for connecting to the central network core. The backend network interface 230 includes one or more wired or wireless network interfaces for communicating with the central network core 190. In an example, the backend network interface is based on 5G GPRS tunnelling protocol user plane for data communication between the CU and the UPF of the network device. In an example, where the network device is the distributed unit 150, the communication with the central network core 190 happens via the central unit 180. Accordingly, the network device 200 is configured to communicate with the one or more network functions 195 of the central network core 190. The network device 200 is configured to receive various network configurations for its operation and the operation of the network aspects of the industrial devices connected to it from the various network functions 195 of the central network core 190.

Additionally, the network device 200 includes one or more secondary network functions 225 for managing a plurality of connections with the industrial devices. The one or more secondary network functions 225 are similar to the one or more network functions 195 of the central network core 190. The one or more secondary network functions are associated with admission control and authentication of the industrial devices, management of user plane and sessions related to connections associated with the industrial devices. The one or more network functions 195 of the central network core 190 are configured to forward network configurations and control information associated with one or more user devices connected to the network device 200 to the one or more secondary network functions 225. Based on the received network configurations and control information associated with one or more user devices, the one or more secondary network functions are configured to manage the user devices. The secondary network functions are installed in the network device 200 as software modules and manage the control plane and the user plane between the network device 200 and the one or more user devices connected to the network device 200. Accordingly, the secondary network functions are realized by one or more processors 220.

In an example, the one or more secondary network functions includes a network exposure function (NEF), a session management function (SMF), authentication server function (AUSF), unified data management function (UDM), user plane function (UPF), etc. The network exposure function from the one or more secondary functions acts as an interface between the network functions of the central network core and the other secondary network functions, is used to configure the local core functions and report local information to the central network core. Similarly, a specialized application network function (AF) is implemented in the central network core to coordinate with the one or more secondary network functions. For example, for establishing a PDU session between the network device and the user plane function of the central network core, the coordination between the local SMF of the one or more secondary network functions and the SMF of the central network core happens via the local NEF of the one or more secondary network functions and the application function. Additionally, the application network function is responsible for transferring user information, security information, and network configuration and policies between the central network core and the one or more secondary network functions. The application network function also retrieves performance and maintenance data from the one or more secondary network functions.

Accordingly, in this way the network device includes the necessary functionalities of the central network core via the one or more secondary network functions, which allow for the network device to function as semi-independent micro-network (along with the user device connected to it) without relying completely on the central network core. This allows for management control and user data locally at network device along with intra micro-network communication without involving the central core network. This helps in reducing control plane latency is reduced and the communication among devices under the network device will benefit of a very short latency because also the admission control and the user plane set up occurs locally. For example, the industrial devices 110 and 120 may be able to communicate with each other via the network device 200 without looping the central network core 190. By reducing the session set up and authentication time, the latter may be executed every time data have to be sent which correspond in drastically increasing the level of wireless communication security. Such coordination between the one or more network functions and the one or more secondary network functions is explained with an example as shown below in relation to device authentication. While the above method has been explained using a distributed unit including the secondary functions, the realization of secondary functions may be performed across the distributed unit and the central unit. Accordingly, the network device 200 may include both distributed unit and central unit.

For example, independently from the identification method, all the user devices have a subscription identity associated with to the central network core, for example international mobile subscriber identity (IMSI). In an example, a user device has been provisioned in the central core and has not yet been aligned with a micro-net associated the network device 200. When a user device connects to the network device 200 and sends a registration request for the first time (i.e., onboarding of the user device), the local AUSF function sends the request to the AUSF function of the central network core via the local network exposure function and the application function of the central network core. Accordingly, the local AUSF function acts as proxy of the AUSF of the central network core. The user device is authenticated by the AUSF of the central network core. Then, the AF sends the configuration data to the network device 200 so that further user device access may be managed locally at the network device 200. Such configuration data and method of onboarding is explained below in reference to FIG. 3.

Figure 3:
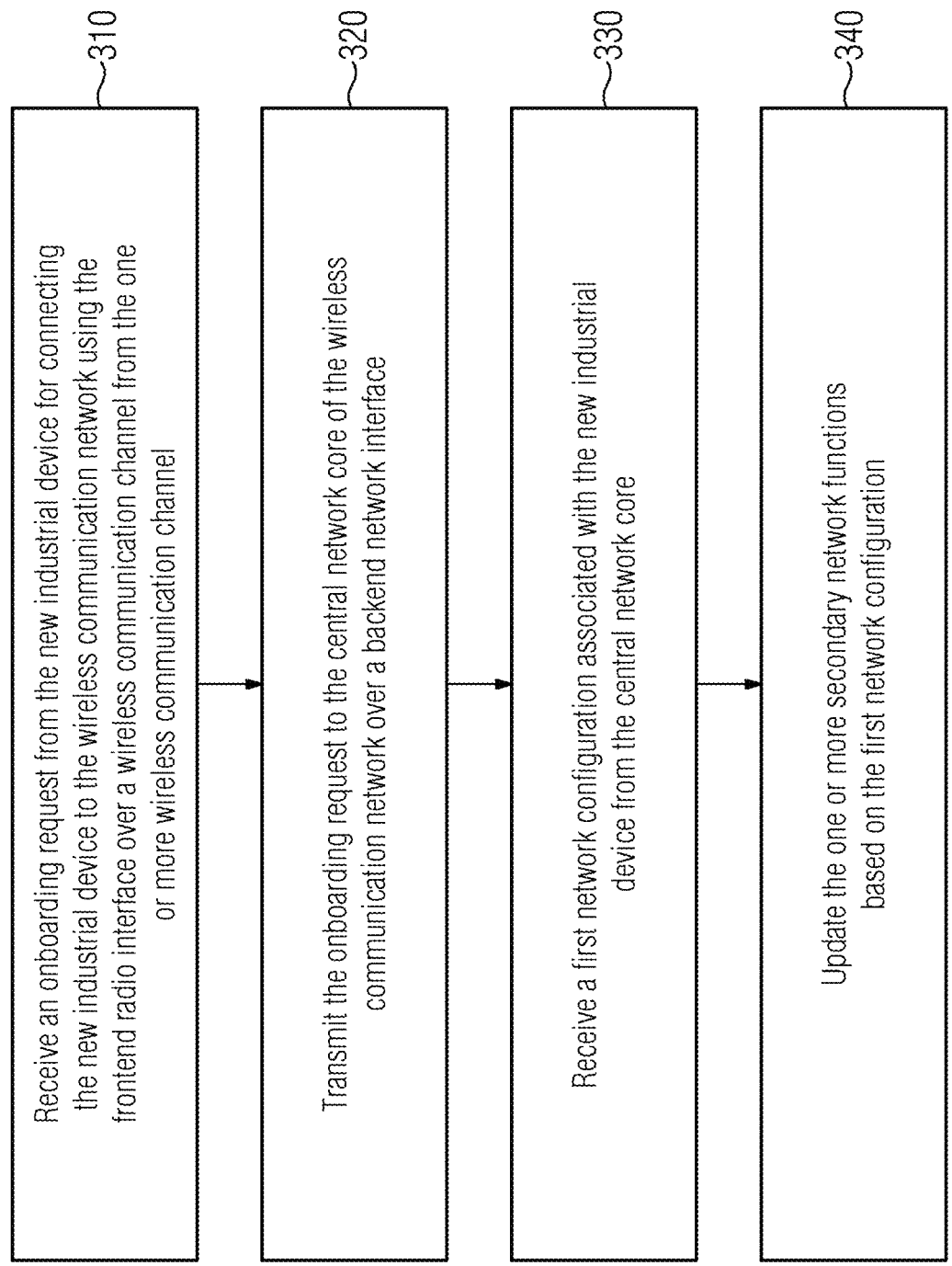
FIG. 3 illustrates an example method for connecting a new industrial device to the wireless communication network using the example network device.

FIG. 3 illustrates a method 300 for connecting a new industrial device to the wireless communication network by the network device 200. At act 310, the network device 200 receives an onboarding request from the new industrial device for connecting the new industrial device to the wireless communication network using the frontend radio interface 210 over a wireless communication channel from the one or more wireless communication channels.

At act 320, the network device 200 transmits the onboarding request to the central network core of the wireless communication network over a backend network interface 230. Upon receiving the request, the local AUSF function from the one or more secondary network functions 225 evaluates if the new industrial device has been previously authenticated by the network device 200. Because the new industrial device has not been onboarded, the local AUSF does not have a record of the new industrial device and accordingly transmits the onboarding request to the central network core via the local network exposure function. The application function of the central network core receives the onboarding request and passes the onboarding request to the AUSF function of the one or more network functions of the central network core. The AUSF function authenticates the onboarding request. Once the new industrial device is authenticated, the related network configuration including security polices and control information is fetched from the one or more network functions of the central network core by the application function and transmitted to the network exposure function of the one or more secondary network functions. For example, subscription permanent identifier (SUPI), the authentication keys, the security policy associated with the industrial device, max QoS associated with the industrial user device, IP ranges associated with the industrial device, etc., are transmitted to the secondary network functions from the application function.

At act 330, the network device 200 receives a first network configuration associated with the new industrial device from the central network core. As mentioned above, the application function of the central network core is configured to fetch network configuration associated with the industrial device from the one or more network functions. Network configuration herein refers to one or more network aspects related to the industrial device and includes security policies, authentication keys, quality of service requirements associated with the industrial device such as maximum and minimum bandwidth, IP ranges, etc., redundancy policies etc.

At act 340, the network device 200 updates the one or more secondary network functions based on the first network configuration. Based on the first network configuration, the one or more secondary network functions are updated with the network configuration of the industrial device. For example, the local AUSF of the one or more secondary network functions is updated to store the authentication keys and the security policy associated with the industrial device. Accordingly, the connection between the new industrial device and the network device is managed by the one or more secondary network functions in accordance with the first network configuration. For example, the bandwidth of the connection between the network device and the industrial device is defined based on the QoS policy of the first network configuration. Additionally, subsequent to the configuration, the one or more secondary network functions are configured to operate independent of a connection to the central network core.

While the current disclosure has been described in relation to a single network device with one or more secondary network functions, a plurality of such network devices may be used in the industrial facility. Accordingly, such network devices with their micro-networks may communicate with each other without looping the central network core. This is further explained in relation to FIG. 4.

Figure 4:
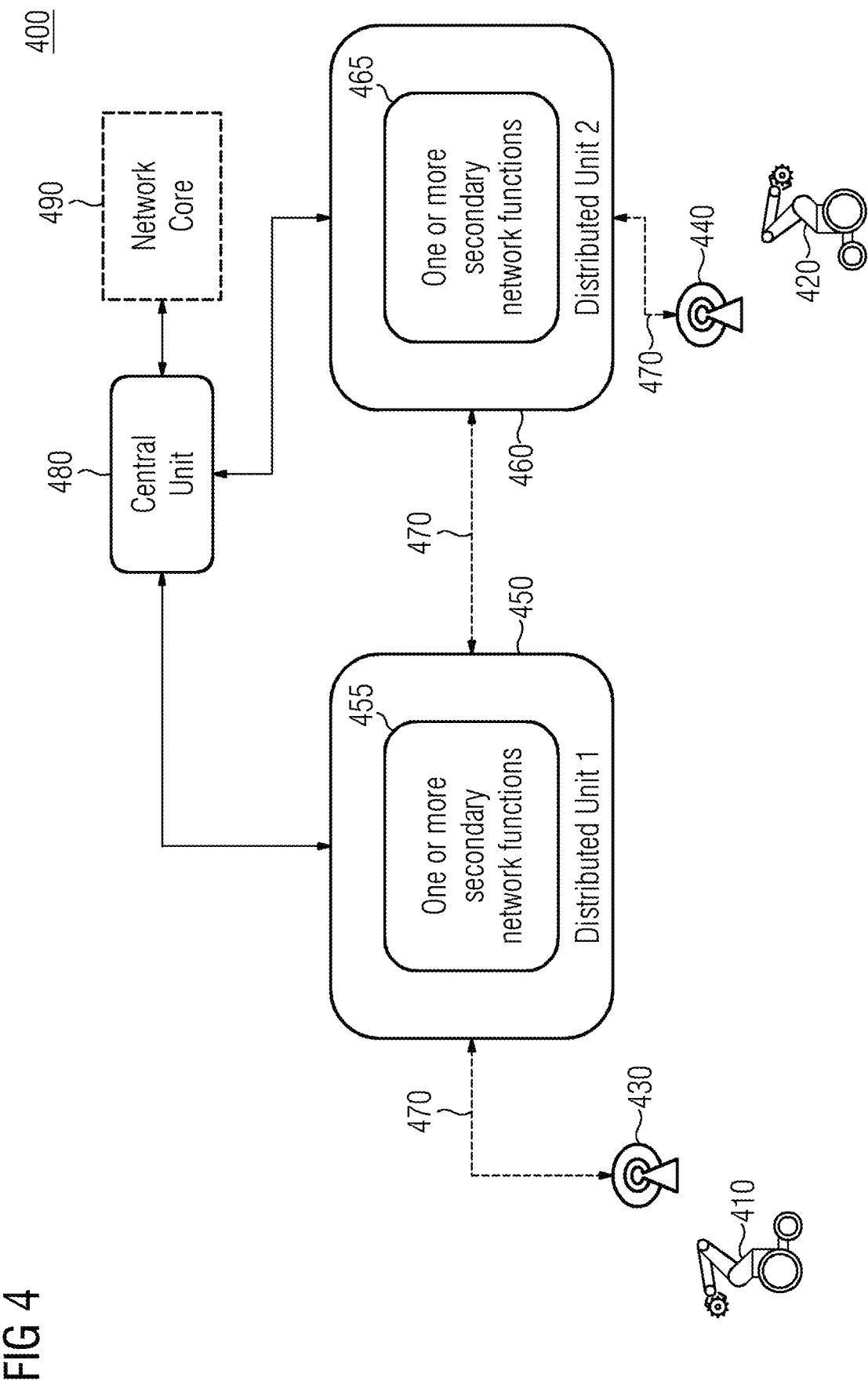
FIG. 4 illustrates two example network devices connected to each other via a user plane.

FIG. 4 illustrates two network devices 450 and 460 connected to each other via a user plane 470. The user plane 470 is independent of the network core 190. The network device 450 is a distributed unit and is connected to an industrial device 410 via a radio unit 430. Similarly, the network device 460 is a distributed unit and is connected an industrial device 420 via a radio unit 440. The user plane 470 extends between the industrial device 410 and the industrial device 420. Accordingly, communication between the industrial device 410 and industrial device 420 takes place over the user plane 470. Because the user plane 470 is independent of the central network core 490, the communication between the industrial devices 410 and 420 has reduced latency because the central network core is not looped in the communication between the industrial devices 410 and 420. Accordingly, establishment of the connection between the industrial devices 410 and 420 and management of the connection between the industrial devices 410 and 420 is performed by the secondary network functions of the network device 450 and 460. Accordingly, for the establishment of the user plane, the user plane function of the network device 450 is connected to the user plane function of the network device 460, for transmitting and receiving data between the industrial devices 410 and 420.

In an example, the network devices 450 and 460 may support handover of devices amongst themselves. For example, an industrial device 420 may move from a radio range of the network device 460 and into a radio range of the network device 450. Accordingly, the NEF of the network device 450 is configured to communicate with the NEF of the network device 460 to receive user information of a second industrial device. For example, the NEF of the network device 460 is configured to fetch authentication information from the AUSF from the network device 460 and transmit the same to the NEF of the network device 450. Other such network configuration information may be transferred from the network device 460 to the network device 450. Accordingly, latency of such handover is improved by excluding overhead associated with communication with the central network core.

It is to be noted that while the above disclosure has explained in relation to the network device, the above method may be realized in another device or a plurality of devices. For example, the method 200 may be implemented in an edge server. Accordingly, the present disclosure may take a form of a computer program product including program modules accessible from computer-usable or computer-readable medium storing program code for use by or in connection with one or more computers, processing units, or instruction execution system. Accordingly, the network device includes a memory module or a non-transitory storage medium including instructions for realizing the secondary network functions 225 using the processors 220.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A network device for connecting a plurality of industrial devices to a wireless communication network, the network device comprising:
a frontend radio interface configured to connect to the plurality of industrial devices over one or more wireless communication channels for transmitting data to and receiving data from the plurality of industrial devices;
a backend network interface configured to connect to a central network core associated with the wireless communication network over a communication channel, wherein the central network core comprises one or more network functions for managing the wireless communication network; and
one or more secondary network functions for managing a plurality of connections with the plurality of industrial devices,
wherein the one or more secondary network functions are configured based on the one or more network functions of the central network core,
wherein the one or more secondary network functions are installed in the network device as software modules and manage a control plane and a user plane between the network device and the plurality of industrial devices connected to the network device,
wherein a network exposure function from the one or more secondary network functions is configured to receive an onboarding request from a new industrial device, transmit the onboarding request to the central network core, and receive one or more network configurations associated with the one or more secondary network functions in relation to the new industrial device,
wherein, upon authentication of the new industrial device, a first network configuration comprising security polices and control information is retrieved from the one or more network functions of the central network core by an application function and transmitted to the network exposure function of the one or more secondary network functions,
wherein the network exposure function is configured to receive the first network configuration associated with the new industrial device from the central network core, and
wherein the network device is configured to update the one or more secondary network functions based on the first network configuration.

2. The network device of claim 1, wherein the one or more secondary network functions are configured to operate independent of a connection to the central network core.

3. The network device of claim 1, wherein the one or more secondary network functions are associated with admission control and authentication of the plurality of industrial devices, management of the user plane, and sessions related to connections associated with the plurality of industrial devices.

4. The network device of claim 1, wherein the network device is one of a cellular base station and a distributed unit of a distributed base station.

5. The network device of claim 1, wherein the network device is configured to transmit information from a first industrial device connected to the network device to a second industrial device via a second network device using a first user plane present between the network device and the second network device.

6. The network device of claim 5, wherein the first user plane is not connected to the central network core.

7. The network device of claim 1, wherein the network exposure function is further configured to communicate with a second network exposure function of a second network device for receiving user information of a second industrial device, and wherein the second industrial device is connected to the second network device.

8. A method for connecting a new industrial device to a wireless communication network, by a network device comprising one or more secondary network functions, the method comprising:

receiving an onboarding request from the new industrial device for connecting the new industrial device to the wireless communication network using a frontend radio interface of the network device over a wireless communication channel from one or more wireless communication channels, wherein a network exposure function from the one or more secondary network functions of the network device receives the onboarding request from the new industrial device;

transmitting the onboarding request to a central network core of the wireless communication network over a backend network interface of the network device, the central network core comprising one or more network functions for managing the wireless communication network, wherein the network exposure function is configured to transmit the onboarding request to the central network core;

receiving a first network configuration associated with the new industrial device from the central network core, wherein the network exposure function is configured to receive one or more network configurations associated with the one or more secondary network functions in relation to the new industrial device; and updating the one or more secondary network functions based on the first network configuration, wherein once the new industrial device is authenticated, the first network configuration including security polices and control information is fetched from the one or more network functions of the central network core by an application function and transmitted to the network exposure function, wherein the network exposure function is configured to receive the first network configuration associated with the new industrial device from the central network core and to update the one or more secondary network functions based on the first network configuration, wherein the connection between the new industrial device and the network device is managed by the one or more secondary network functions in accordance with the first network configuration.

* * * * *